(12) United States Patent
Germiquet et al.

(10) Patent No.: US 9,964,224 B2
(45) Date of Patent: May 8, 2018

(54) SEMI-IMPERMEABLE CLOSURE DEVICE (71) Applicant: The Swatch Group Research and Development Ltd, Marin (CH)

(72) Inventors: Christophe Germiquet, Preles (CH); Michael Stalder, Bienne (CH)

(73) Assignee: The Swatch Group Research and Development Ltd, Marin (CH)

( * ) Notice: Subject to any disclaimer, the term of this patent is extended or adjusted under 35 U.S.C. 154(b) by 40 days.

(21) Appl. No.: 15/126,136

(22) PCT Filed: Jun. 17, 2015

(86) PCT No.: PCT/EP2015/063593
§ 371 (c)(1),
(2) Date: Sep. 14, 2016

(87) PCT Pub. No.: WO2015/193373
PCT Pub. Date: Dec. 23, 2015

(65) Prior Publication Data
US 2017/0146142 A1 May 25, 2017

(30) Foreign Application Priority Data
Jun. 20, 2014 (EP) .................................... 14173297

(51) Int. Cl.
*F16K 27/00* (2006.01)
*G01C 5/00* (2006.01)
(Continued)

(52) U.S. Cl.
CPC ................ *F16K 27/00* (2013.01); *F16K 1/16* (2013.01); *F16K 27/0209* (2013.01); *G01C 5/00* (2013.01);
(Continued)

(58) Field of Classification Search
CPC .... G04B 37/00; G04B 37/02; G04B 37/0008; G04B 37/08; G04B 37/18; F16K 13/00;
(Continued)

(56) References Cited

U.S. PATENT DOCUMENTS 2,468,430 A 4/1949 Derksen et al.
4,262,062 A 4/1981 Zatsky
(Continued)

FOREIGN PATENT DOCUMENTS

JP 08-129076 A 5/1996
WO 98/47191 10/1998

OTHER PUBLICATIONS

JP H08129076A machine translation.*
International Search Report dated Sep. 9, 2015 in PCT/EP2015/063593 filed Jun. 17, 2015.

*Primary Examiner* — Ian Paquette
(74) *Attorney, Agent, or Firm* — Oblon, McClelland, Maier & Neustadt, L.L.P.

(57) ABSTRACT

A portable object includes a case forming a housing in which is arranged a device requiring air to operate. The case includes at least a first opening. The portable object further includes a closure device provided with a valve system arranged to have a first stable, open position in which the orifice is open and allows air to pass through, and a second stable, closed position, in which the orifice is closed so that the portable object is impermeable to gases and to liquids. Switching from the open position to the closed position is automatic in case of immersion.

14 Claims, 4 Drawing Sheets

(51) Int. Cl.
*G04B 37/00* (2006.01)
*H01M 2/12* (2006.01)
*F16K 1/16* (2006.01)
*H01M 12/08* (2006.01)
*F16K 27/02* (2006.01)

(52) U.S. Cl.
CPC ...... *G04B 37/0008* (2013.01); *H01M 2/1223* (2013.01); *H01M 12/085* (2013.01)

(58) Field of Classification Search
CPC ........ F16K 13/10; F16K 27/00; F16K 27/003; F16K 27/006; F16K 27/02; F16K 27/0209; F16K 27/0254; F16K 27/045; F16K 27/12; F16K 1/16; F16K 1/18; F16K 1/20; F16K 1/2007; F16K 1/2014; F16K 1/2042; F16K 1/205; F16K 1/2085; F16K 1/2092; H01M 12/04–12/085; H01M 2/12–2/1294; G01C 5/00; G01C 5/005
USPC .......................... 368/286, 289, 290, 291, 292
See application file for complete search history.

(56) References Cited

U.S. PATENT DOCUMENTS

| | | | |
|---|---|---|---|
| 5,913,505 A * | 6/1999 | Ouvrard | F16K 31/105 251/298 |
| 8,333,504 B2 * | 12/2012 | Hozumi | G04B 37/08 368/286 |
| 2014/0162092 A1 * | 6/2014 | Reitzle | H01M 2/1229 429/54 |
| 2016/0329550 A1 * | 11/2016 | Kohlberger | H01M 2/1241 |

* cited by examiner

Fig. 8

SEMI-IMPERMEABLE CLOSURE DEVICE

The present invention concerns a portable object including a case forming a housing, inside which is arranged a device that requires air to operate.

PRIOR ART

There are known portable objects, such as watches or mobile telephone devices or touch tablets, which are considered to be waterproof to allow for use in an aquatic environment. To this end, said portable object is provided with a multitude of gaskets or solutions for ensuring virtually perfect impermeability both to gases and to liquids. In horology, gaskets are generally used to provide a seal between two moving parts, for example the winding button and the winding stem, or between two fixed parts, for example the case back and case middle. These gaskets are generally not totally impermeable to gases, but gas permeability remains very low. It is mainly gases that are formed of very small molecules or are highly soluble in the gaskets which have a notable permeability.

However, there are applications in which this high impermeability to gases is a drawback. Indeed, in altimeter type applications or where a zinc air power supply is used, an air flow must be allowed between the housing of the portable object, in which the altimeter device and/or the zinc air power supply are arranged, and the exterior of the portable object.

While such objects exist, it is necessary to maintain the impermeability of said device.

It is also known to use membranes made of Gore-Tex® material. This material is known to be porous, i.e. it has a multitude of pores of such small size that it allows gases to pass through while blocking liquids.

However, this material has a drawback. Indeed, a membrane made of Gore-Tex® type material will only be waterproof to a limited depth of 15 to 40 m. Beyond this depth, water bubbles shrink under pressure which then allows water to pass through the pores making the material permeable.

SUMMARY OF THE INVENTION

It is therefore an object of the present invention to overcome the drawbacks of the prior art by providing a portable object including a semi-impermeable device, i.e. which allows gases to pass through but not liquids.

To this end, the invention concerns a portable object comprising a case forming a housing or an enclosure in which a device requiring air to operate is arranged, characterized in that said case includes at least a first opening, said portable object further including a closure device provided with a valve system arranged to have a first, open position in which the orifice is open and allows air to pass through, and a second, closed position, in which the orifice is closed so that the portable object is impermeable to gases and to liquids.

In a first advantageous embodiment, said device requiring air to operate is a zinc air battery.

In a second advantageous embodiment, said device requiring air to operate is an altimeter.

In a third advantageous embodiment, the valve system includes a valve mounted to be moved by an actuator, said actuator including an arm at the free end of which the valve is fixed.

In a fourth advantageous embodiment, the actuator moves the valve in a motion of translation.

In a fifth advantageous embodiment, the actuator is controlled by an electronic system arranged in the portable object.

In another advantageous embodiment the valve system includes a valve mounted to be moved by a bar mounted to pivot on a base element, said valve being mounted at a first end of the bar.

In another advantageous embodiment, the valve system further includes a second opening in which is arranged a push-piece, said push-piece being fixed to a second end of the bar such that action on the push-piece in one direction causes the valve to move in the opposite direction.

In another advantageous embodiment, the valve includes a circular base from which extends a stem whose free end is fixed to said bar, said base entering into contact with said case for closure thereof.

In another advantageous embodiment, the first opening includes a recessed area having a section of smaller diameter, said base entering into contact with said recessed area to close said case.

In another advantageous embodiment, the valve takes the form of a cylinder ending in a cone, the first opening having a similar shape such that the valve can be inserted into said first opening.

In another advantageous embodiment, the closure device further includes a semi-permeable membrane comprising a porous support on which a film that is permeable to gases and impermeable to liquids is fixed, the thickness of said film making it possible to change the time constant of the equilibrium of gases between the interior and exterior of the portable object.

BRIEF DESCRIPTION OF THE DRAWINGS

The objects, advantages and features of the device according to the present invention will appear more clearly in the following detailed description of at least one embodiment of the invention, given solely by way of non-limiting example and illustrated by the annexed drawings, in which.

DETAILED DESCRIPTION

A portable object 1 according to the present invention is represented in FIGS. 1 to 8. This portable object 1 may take the form of a timepiece or a mobile telephone or a smart phone or a touch tablet.

Figure 1:
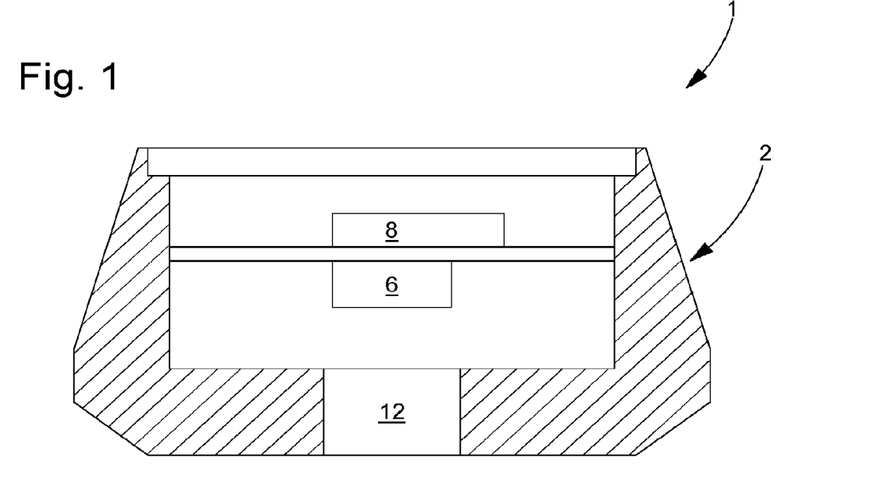
FIG. 1 is a schematic view of a portable object according to the invention.

Portable object 1 includes a case 2 forming a housing or enclosure inside which is arranged a device 4 that requires air to operate.

In a first embodiment seen in FIGS. 1 to 4, device 4 requiring air to operate is an electric battery 6. This battery is, for example, of the zinc air type, i.e. it uses oxygen from the air to oxidise the metal of which it is formed and to supply electricity. Such a zinc air battery must be supplied with oxygen to continue to operate. However, permeability to air, in particular to water vapour, must not be excessive otherwise the battery will dry up or be flooded and lose performance.

This electric battery is used to operate an electronic system 8 associated with display means 10. Electronic system 8 may also comprise control means and/or communication means.

Advantageously according to the invention, the portable object is also provided with a closure device 12 enabling the battery to be supplied with air while ensuring that the portable object is impermeable to liquids. Closure device 12 is thus capable of allowing said portable object to be immersed to depths of more than 100 m and up to 200 m.

Figure 2:
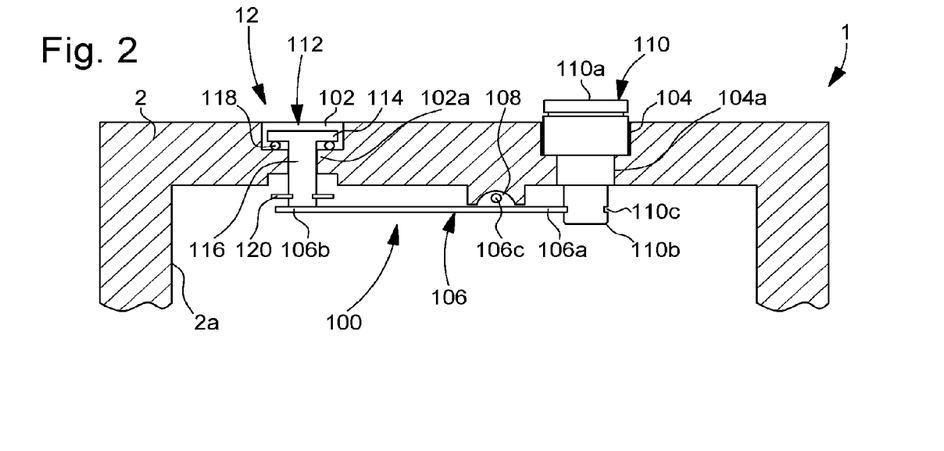
FIG. 2 is a schematic view of a first variant of a first embodiment of the portable object according to the invention.

In a first embodiment shown in FIG. 2, case 2 of the portable object is arranged to include a first opening or orifice 102, and a second opening 104 located in the case back. First opening 102 and second opening 104 are preferably circular. Closure device 12 then takes the form of a valve system 100. This valve system 100 includes a bar 106 mounted to pivot on a base element 108 via a pivot arbor 106c. The base element is disposed on the inner side 2a of case 2. Bar 106 has a first end 106a and a second end 106b.

The first end 106a is arranged to cooperate with a push-piece 110. Push-piece 110 is to be inserted in second opening 104, with first opening 102 being the opening that allows air to enter. This push-piece 110 is a part whose section is identical to that of second opening 104 so as to form a cylindrical part. The cylindrical part forming the push-piece includes an outer end 110a visible from the exterior of the portable object, and an inner end 110b. This inner end 110b of push-piece 110 is coupled to bar 106 via a groove 110c such that the movement of the push-piece causes the bar to tip.

It may be provided that the section of the push-piece is not constant. Indeed, second opening 104 may have a recessed diameter 104a such that the diameter is reduced. This recessed diameter 104a produces a stop member preventing push-piece 110 from being pushed inside case 2.

On the second end of the bar, there is arranged a valve 112. This valve 112 takes the form of a circular base 114 from which extends a stem 116 whose free end is fixed to bar 106. Valve 112 is thus used to close first opening 102.

First opening 102 may have a recessed area 102a having a section of smaller diameter. This recessed area 102a is used to cooperate with valve 112 to open or close said opening 102.

Indeed, valve 112 is integral with bar 106 such that the tipping of bar 106 with respect to its pivot arbor 106c results in a change in position of valve 112 with respect to recessed area 102a. Thus, when the push-piece is pushed inside case 2, the bar tips on its pivot arbor 106c. Valve 112 is then moved in the opposite direction. In this precise case, valve 112 moves away from recessed area 102a allowing air to enter case 2.

When push-piece 110 is pulled towards the exterior of case 2, bar 106 tips on its pivot arbor 106c. Valve 112 is then moved in the opposite direction, in the present case, closer to recessed area 102a Contact occurs between recessed area 102a and valve 112 to block the air and prevent it entering case 2. Push-piece 110 may be provided, at its outer end 110a, with a groove 110d to facilitate gripping of said push-piece 110. It could be provided that, when push-piece 110 is in the pushed-in position to allow valve 112 to open, said push-piece 110 protrudes from case 22 to facilitate gripping thereof.

Valve 112 is thus arranged to have a first, open position in which the opening is open and allows air to pass through and a second, closed position in which the opening is closed, such that the portable object is impermeable to gases and to liquids.

Artfully, it may be provided that valve system 100 closes automatically in the event of contact with an aquatic environment. Indeed, when valve 112 is in the open position, air enters inside the case. However, if the user suddenly dives into an aquatic environment or forgets that the push-piece is in the pushed-in position, water may rush into case 2 and cause damage. Therefore, bar 106 is made of a material with flexible properties. This property means that, when portable object 1 is immersed in an aquatic environment, there is water pressure exerted on bar 106. This pressure causes a deformation of bar 106 and therefore a displacement of valve 112 which will be pressed onto the recessed area. First opening 102 will then be closed and render portable object 1 impermeable.

In another variant, it may be provided to place a gasket 118 on recessed area 102a. This gasket 118 is inserted between base 114 of valve 112 and recessed area 102a and provides better impermeability to liquids.

In another variant, a stop member 120 is arranged on lower face 2a of case 2. This stop member 120 is used to limit the travel of valve 112.

In another variant, it may be provided that valve system 100 is arranged such that pushing on the push-piece causes valve 112 to close whereas pulling the push-piece causes said valve 112 to open.

Figure 3:
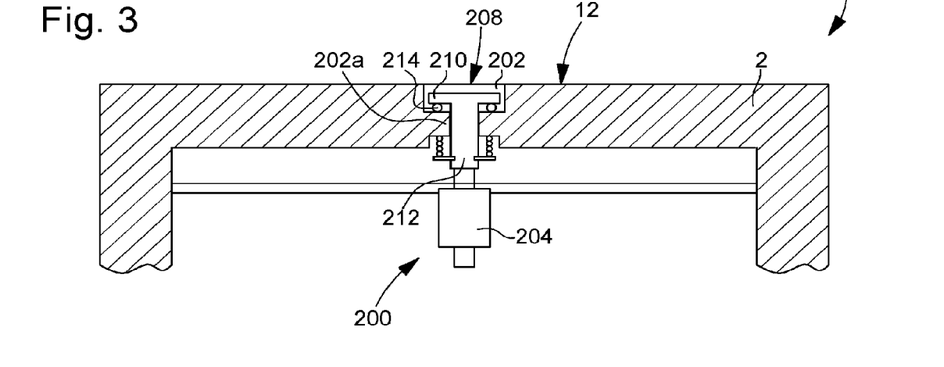
FIGS. 3, 4 and 10 are schematic views of a second variant of the first embodiment of the portable object according to the invention.
Figure 4:
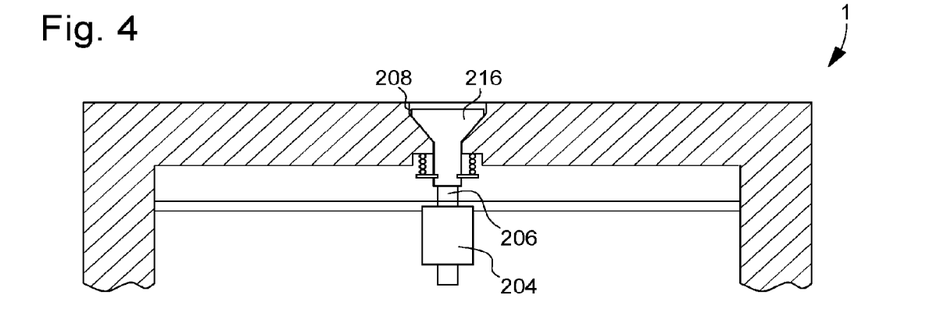

In a second variant, case 2 of the portable object is arranged to include a first opening or orifice 202 allowing a large volume of air to pass through, located in the case back. Closure device 12 then takes the form of a valve system 200 controlled by an actuator. This valve system 200 includes an actuator 204 connected via an arm 206 to a valve 208. The actuator is controlled by a micro-controller integrated in electronic system 8, the latter can automatically control actuator 204 or transmit a manual command from the user via control means. Actuator 204 then acts on valve 208, by moving it in translation to close or open said first opening 202. Valve 200 is thus arranged to have a first, open position in which the opening is open and allows air to pass through and a second, closed position in which the opening is closed, such that the portable object is impermeable to gases and to liquids.

In a first alternative seen in FIG. 3, the valve takes the form of a circular base 210 from which extends a stem 212 whose free end is fixed to arm 206 and is therefore connected to actuator 204. First opening 202 then has a recessed area 202a having a section of smaller diameter. This recessed area 202a is used to cooperate with valve 208 to open or close said opening 202.

Indeed, when the user or the microcontroller decides that the battery needs air, a command is sent to the actuator. This command orders actuator 204 to act on valve 208 to allow free air access. Actuator 204 then starts to operate to move valve 202 via arm 206. If the battery requires air, valve 208 is moved away from recessed area 202a.

When the user or the microcontroller decides that the battery has sufficient air or is that it needs to be isolated from the external environment, a command is sent to actuator 204. This command orders actuator 204 to act on valve 208 to close air access. Actuator 204 then starts to operate to move valve 202 via arm 206. In such case, valve 208 is moved into contact with recessed area 202a to block air access.

In a variant of this first alternative, it may be provided to place a gasket 214 on recessed area 202a. This gasket 214 is inserted between base 210 of valve 208 and recessed area 202a and provides better impermeability to liquids.

In a second alternative seen in FIG. 4, valve 208 is shaped like a shell 216, i.e. in the form of a cylinder ending in a cone. First opening 202 is also shell-shaped so that valve 208 can be inserted inside opening 202. Since valve 208 and opening 202 have a similar shape, valve 208 rests on the conical portion of the opening providing improved closure efficiency.

Thus, first opening 202 is closed by valve 208 by friction. Indeed, when the user or the microcontroller decides that the battery has sufficient air or is that it needs to be isolated from the external environment, a command is sent to actuator 204. This command orders actuator 204 to act on valve 208 to close air access. Actuator 204 then starts to operate to move the valve via the arm. As the valve and the first opening have a similar shape, the valve fits inside the opening. Fitting the valve inside the opening causes closure of the latter.

In the first and second alternatives, it is possible to overcome the problem of case 2 accidentally opening in an unsuitable environment. Indeed, mishandling may occur or the microcontroller may detect a lack of oxygen and attempt to open case 2. Thus, to avoid this problem, actuator 204 will be dimensioned such that the force that it exerts to open first opening 202 is insufficient when significant pressure is exerted on said valve 208. Thus, if the microcontroller attempts to open valve 208, the pressure exerted by water makes it impossible for valve 208 to be moved by actuator 204.

Figure 10:
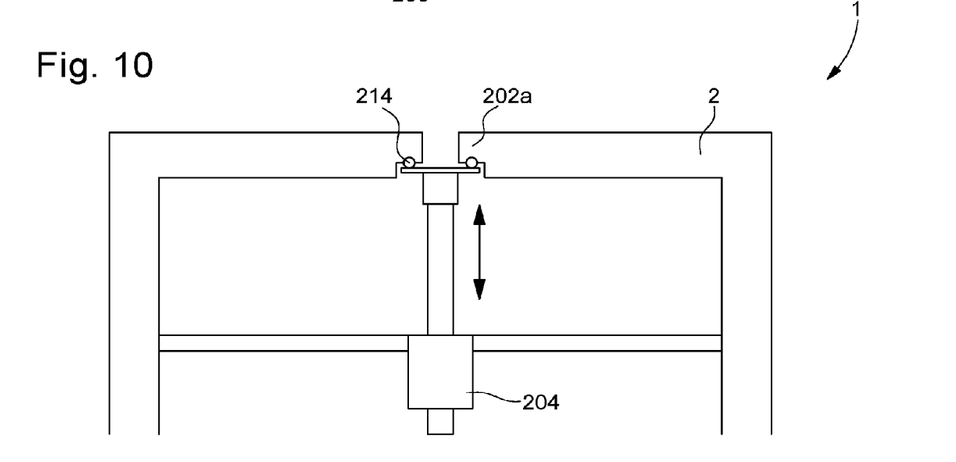

Of course, the valve could also be arranged to be situated on one side or other of recessed area 202a in which opening 202 is made. This arrangement of the valve on one side or other of the recessed area defines the motions of translation necessary to open or close opening 202. Thus, if valve 202 is arranged on the outer wall of the case, as seen in FIG. 3, the motion of translation tending to shorten the arm, i.e. to decrease the distance between the valve and the actuator, causes closure of the orifice, whereas, if valve 208 is arranged on the inner wall of the case, as in FIG. 10, the same motion of translation causes the orifice to open.

Figure 5:
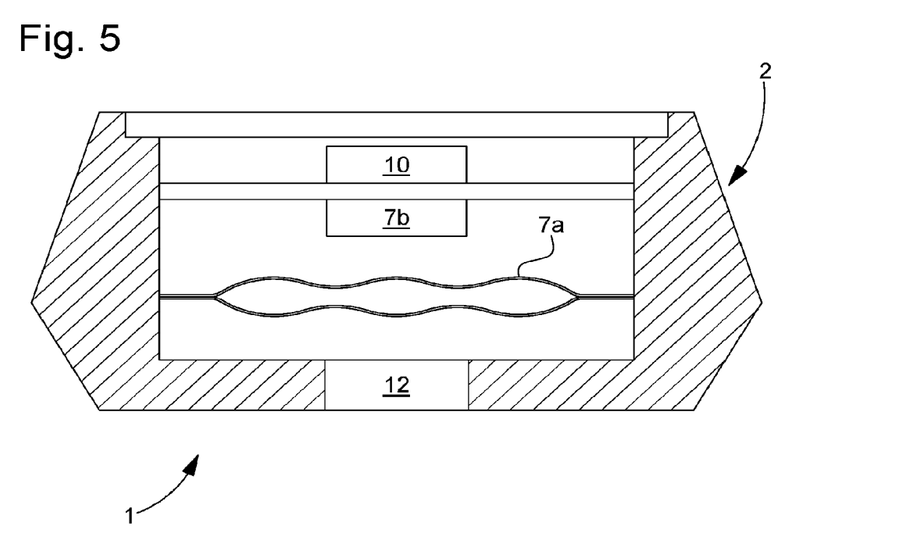
FIG. 5 is a schematic view of a first variant of a second embodiment of the portable object according to the invention.

In a second advantageous embodiment seen in FIG. 5, the device requiring air for operation 4 is an altimeter 7. Altimeter 7 may be mechanical or electronic and includes a deformable membrane 7a.

In the case of a mechanical altimeter, the latter includes a transmission mechanism 7b. Membrane 7a is capable of deforming mechanically under the effect of external pressure acting in that case on transmission device 7b. Transmission mechanism 7b thus transfers said movement of deformation from membrane 7a, representing pressure, to display means 10 which display the altitude value.

In the case of an electronic altimeter (not represented), the latter includes a transmission circuit 7c. Membrane 7a is capable of deforming mechanically under the effect of external pressure acting in that case on transmission circuit 7c. Transmission circuit 7c is an interface allowing the deformation of the membrane to be converted into an electrical signal. This electrical signal is processed so that display means 10 can use it to display altitude information.

Advantageously according to the invention, portable object 1 is also provided with a closure device 12 allowing air to penetrate the housing of the portable object to interact with membrane 7a of the altimeter without water penetrating.

Figure 6:
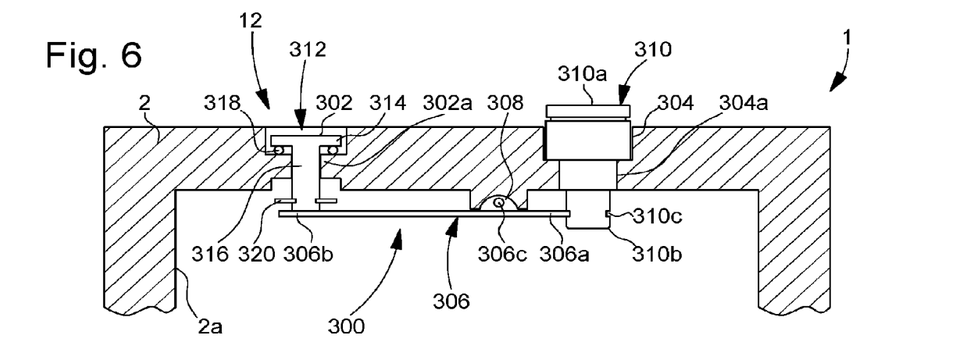
FIG. 6 is a schematic view of a first variant of a second embodiment of the portable object according to the invention.

In a first variant seen in FIG. 6, case 2 of the portable object is arranged to include a first opening 302 and a second opening 304 allowing a large volume of air to pass through, located in the case back. First opening 302 and second opening 304 are preferably circular. Closure device 12 then takes the form of a valve system 300. This valve system 300 includes a bar 306 mounted to pivot on a base element 308 via a pivot arbor 306c. The base element is disposed on the inner side 2a of case 2. Bar 306 has a first end 306a and a second end 106b.

The first end 306a is arranged to cooperate with a push-piece 310, said push-piece 310 is to be inserted inside the second opening. This push-piece 310 is a part whose section is identical to that of second opening 304 so as to form a cylindrical part. The cylindrical part forming the push-piece includes an outer end 310a visible from the exterior of the portable object, and an inner end 310b. This inner end 310b of push-piece 310 is coupled to bar 306 via a groove 310c such that the movement of the push-piece causes the bar to tip.

It may be provided that the section of the push-piece is not constant. Indeed, second opening 304 may have a recessed diameter 304a such that the diameter is reduced. This recessed diameter 304a creates a stop member preventing push-piece 310 from being pushed inside case 2.

On the second end of the bar, there is arranged a valve 312. This valve 312 takes the form of a circular base 314 from which extends a stem 316 whose free end is fixed to bar 306. Valve 312 is thus used to close first opening 302.

First opening 302 may have a recessed area 302a having a section of smaller diameter. This recessed area 302a is used to cooperate with valve 312 to open or close said opening 302.

Indeed, valve 312 is integral with bar 306 such that the tipping of bar 306 with respect to its pivot arbor 306c results in a change in position of valve 312 with respect to recessed area 302a. Thus, when the push-piece is pushed inside case 2, the bar tips on its pivot arbor 306c. Valve 312 is then moved in the opposite direction. In this precise case, valve 312 moves away from recessed area 302a allowing air to enter case 2.

When push-piece 310 is pulled towards the exterior of case 2, bar 306 tips on its pivot arbor 306c. Valve 312 is then moved in the opposite direction, in the present case, closer to recessed area 302a. Contact occurs between recessed area 302a and valve 312 to block the air and prevent it entering case 2. Push-piece 310 may be provided, at its outer end 310a, with a groove 310d to facilitate gripping of said push-piece 310. It could be provided that, when push-piece 310 is in the pushed-in position to allow valve 312 to open, said push-piece 310 protrudes from case 22 to facilitate gripping thereof.

Artfully, it may be provided that valve system 12 closes automatically in the event of contact with an aquatic environment. Indeed, when valve 312 is in the open position, air enters inside the case. However, if the user suddenly dives into an aquatic environment or forgets that the push-piece is in the pushed-in position, water may rush into case 2 and cause damage. Therefore, bar 306 is made of a material with flexible properties. This property means that, when portable object 1 is immersed in an aquatic environment, there is water pressure exerted on bar 306. This pressure causes a deformation of bar 306 and therefore a displacement of valve 312 which will be pressed onto the recessed area. First opening 302 will then be closed and render portable object 1 impermeable.

In another variant, it may be provided to place a gasket 318 on recessed area 302a. This gasket 318 is inserted between base 314 of valve 312 and recessed area 302a and provides better impermeability to liquids.

In another variant, a stop member 320 is arranged on lower face 2a of case 2. This stop member 320 is used to limit the travel of valve 312.

Figure 7:
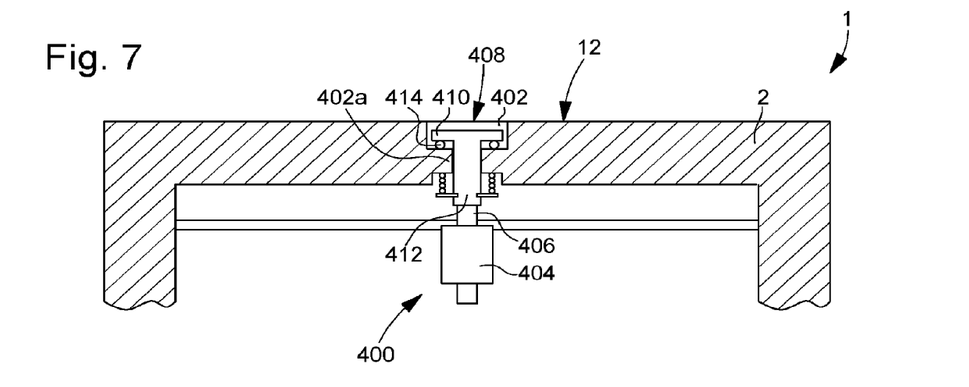
FIGS. 7 and 8 are schematic views of a second variant of the second embodiment of the portable object according to the invention.
Figure 8:
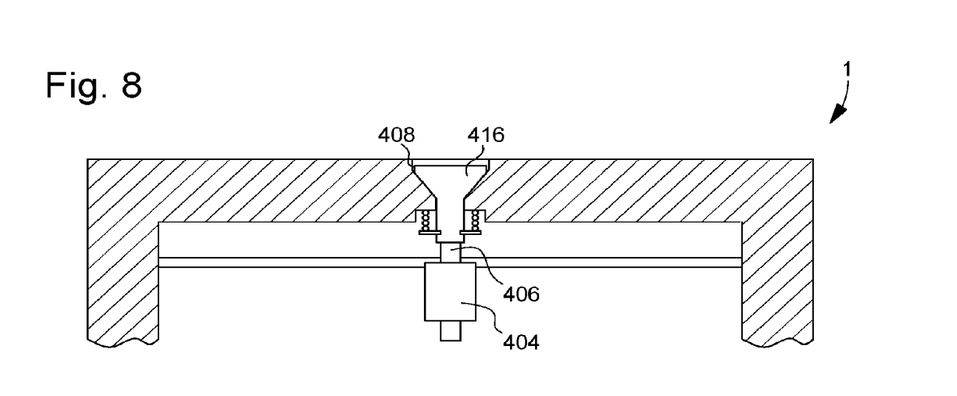

In a second variant, case 2 of the portable object is arranged to include a first opening or orifice 402 allowing a large volume of air to pass through, located in the case back. Closure device 12 then takes the form of a valve system 400 controlled by an actuator. This valve system 400 includes an actuator 404 connected via an arm 406 to a valve 408. The actuator is controlled by a micro-controller integrated in electronic system 8, the latter can automatically control actuator 404 or transmit a manual command from the user via control means. Actuator 404 then acts on valve 408, by moving it in translation to close or open said first opening 402.

Such a system using an actuator allows the valve to be opened on demand and makes it possible for the valve to be acted on via a remote control or a device acting as a remote control.

In a first alternative seen in FIG. 7, the valve takes the form of a circular base 410 from which extends a stem 412 whose free end is fixed to arm 406 and is therefore connected to actuator 404. First opening 402 then has a recessed area 402a having a section of smaller diameter. This recessed area 402a is used to cooperate with valve 408 to open or close said opening 402.

Indeed, when the user or the microcontroller decides that the battery needs air, a command is sent to the actuator. This command orders actuator 404 to act on valve 408 to allow free air access. Actuator 404 then starts to operate to move valve 408 via arm 406. If the housing needs to be supplied with air for an altitude measurement, valve 408 is moved away from recessed area 402a.

When the user or the microcontroller decides that the battery has sufficient air or is that it needs to be isolated from the external environment, a command is sent to actuator 404. This command orders actuator 404 to act on valve 408 to close air access. Actuator 404 then starts to operate to move valve 408 via arm 406. In such case, valve 408 is moved into contact with recessed area 402a to block air access.

In a variant of this first alternative, it may be provided to place a gasket 414 on recessed area 402a. This gasket 414 is inserted between base 410 of valve 408 and recessed area 402a and provides better impermeability to liquids.

In a second alternative seen in FIG. 8, valve 408 is shaped like a shell 416, i.e. in the form of a cylinder ending in a cone. First opening 402 is also shell-shaped so that valve 408 can be inserted inside opening 402. Since valve 408 and opening 402 have a similar shape, valve 408 rests on the conical portion of the opening providing improved closure efficiency.

Thus, first opening 402 is closed by valve 408 by friction. Indeed, when the user or the microcontroller decides that the altimeter needs to be isolated from the external environment, a command is sent to actuator 404. This command orders actuator 404 to act on valve 408 to close air access. Actuator 204 then starts to operate to move the valve via the arm. As the valve and the first opening have a similar shape, the valve fits inside the opening. Fitting the valve inside the opening causes closure of the latter.

In the first and second alternatives, it is possible to overcome the problem of case 2 accidentally opening in an unsuitable environment. Indeed, mishandling may occur or the microcontroller may detect a lack of oxygen and attempt to open case 2. Thus, to avoid this problem, actuator 404 will be dimensioned such that the force that it exerts to open first opening 402 is insufficient when significant pressure is exerted on said valve 408. Thus, if the microcontroller attempts to open valve 408, the pressure exerted by water makes it impossible for valve 408 to be moved by actuator 404.

Figure 9:
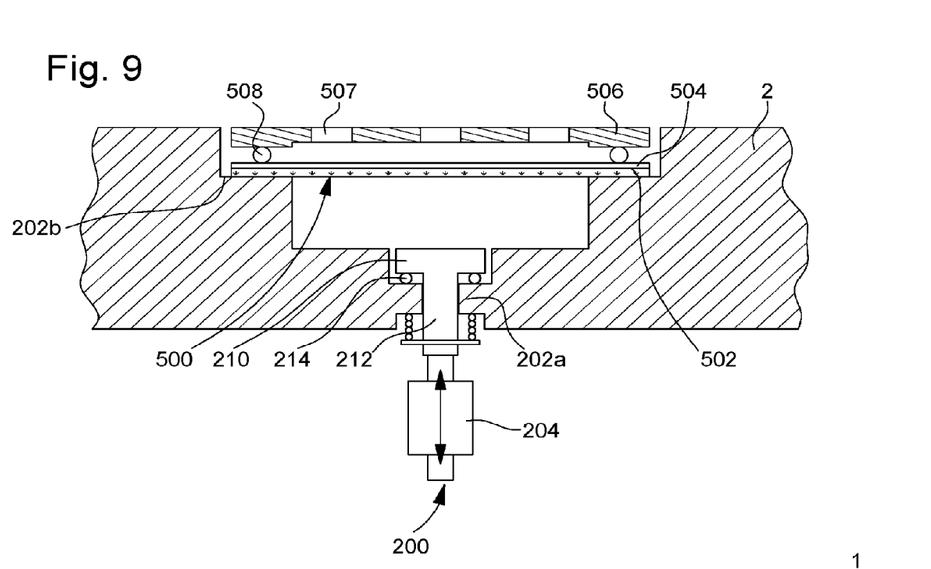
FIG. 9 is a schematic view of a variant of the first and second embodiments of the portable object according to the invention.

In a variant of the first and second embodiments seen in FIG. 9, the case of the portable object is arranged to include a high-density membrane 500. This high-density membrane is placed between the exterior of the portable object and valve systems 100, 200. Therefore, a shoulder 202b is arranged in the opening. This shoulder 202b has a larger diameter than that of opening 102.

The high-density membrane 500, also called a "supported membrane" or "composite membrane" is formed of a film 504, made of a 100% waterproof polymer but which is permeable to gases, like all plastics.

Thus, in order to use film 504, it must be placed on a support 502 which is also a membrane but much thicker. This support membrane is porous so that air can pass through; the only function of support membrane 502 is mechanical, since its only object is to act as a support for polymer film 504. For example, a support membrane made of Gore-Tex® may be used.

To regulate the air flow passing through high-density membrane 500, the parameter to act on is the thickness of film 504. The thinner film 504 and the greater the flow will be, but also the more fragile film 504 will be and vice versa.

Typically, to have a time constant for the equilibrium of gases between the interior and exterior of the portable object on the order of a minute, the thickness of film 504 must be on the order of 10 micr meters.

This high-density membrane is protected from the external environment by a cover 506. Cover 506 can be screwed or clipped to the case middle and an O-ring joint 308 can be used for sealing. Cover 506 includes orifices 507 allowing air to enter inside the case.

The first advantage of this variant is that the closure valve is always dry.

Further, the fact of combining a valve system with a high-density membrane avoids the risk of flooding in the event of inadvertent opening. Indeed, there are two sealing systems provided, so that if the valve system malfunctions or the user forgets to close it, the high-density membrane is still there.

This variant also allows the microcontroller to have control over the air flow inside the watch.

It will be understood that the alternative variants of the first embodiment are applicable to variants of the second embodiment.

It will be clear that various alterations and/or improvements evident to those skilled in the art may be made to the various embodiments of the invention described in this description without departing from the scope of the invention.

The invention claimed is:

1. A portable object comprising a case forming a housing in which is arranged a device requiring air to operate, wherein said case includes at least a first opening, said portable object further including a closure device provided with a valve system arranged to have a first stable, open position in which the orifice is open and allows air to pass through, and a second stable, closed position, in which the orifice is closed so that the portable object is impermeable to gases and to liquids, switching from the open position to the closed position being automatic in case of immersion.

2. The portable object according to claim 1, wherein said device requiring air to operate is a zinc air battery.

3. The portable object according to claim 1, wherein said device requiring air to operate is an altimeter.

4. The portable object according to claim 1, wherein the closure device further includes a semi-permeable membrane comprising a porous support on which is fixed a film that is permeable to gases and impermeable to liquids, the thickness of said film making it possible to change the time constant of the balance of gases between the interior and exterior of the portable object.

5. The portable object according to claim 1, wherein the valve system comprises a valve mounted to be moved by an actuator, said actuator including an arm at the free end of which is fixed the valve.

6. The portable object according to claim 5, wherein the actuator moves the valve in a motion of translation.

7. The portable object according to claim 5, wherein the valve takes the form of a cylinder ending in a cone, the first opening having a similar shape such that the valve can be inserted into said first opening.

8. The portable object according to claim 5, wherein the actuator is controlled by an electronic system arranged inside the portable object.

9. The portable object according to claim 8, wherein the valve system further includes a second opening in which is arranged a push-piece, said push-piece being fixed to a second end of the bar such that action on the push-piece in one direction causes the valve to move in the opposite direction.

10. The portable object according to claim 5, wherein the valve includes a circular base from which extends a stem whose free end is fixed to said bar, said base entering into contact with said case to close said case.

11. The portable object according to claim 10, wherein the first opening includes a recessed area having a section of smaller diameter, said base entering into contact with said recessed area to close said case.

12. The portable object according to claim 1, wherein the valve system includes a valve mounted to be moved via a bar mounted to pivot on a base element, said valve being mounted at a first end of the bar.

13. The portable object according to claim 12, wherein the valve includes a circular base from which extends a stem whose free end is fixed to said bar, said base entering into contact with said case to close said case.

14. The portable object according to claim 13, wherein the first opening includes a recessed area having a section of smaller diameter, said base entering into contact with said recessed area to close said case.

* * * * *